UNITED STATES PATENT OFFICE 2,501,191

N,N'-POLYTHIOAMINES AS PESTICIDES

William D. Stewart and John H. Standen, Yonkers, N. Y., assignors to The B. F. Goodrich Company, New York, N. Y., a corporation of New York No Drawing. Application July 31, 1945, Serial No. 608,099

8 Claims. (Cl. 167—22)

This invention relates to pest control compositions and more specifically to compositions which are useful as bactericides, fungicides and insecticides.

This invention has for its general object the provision of new and useful compositions having the power of killing or repelling economically or physiologically harmful pests such as bacteria, fungi, insects and the like, which prey on plant and animal matter either in its animate or inanimate or fabricated state. Other objects will appear hereinafter.

These objects are accomplished by the following pesticidal compositions comprising as an essential active ingredient a thioamine having the formula $R-S_x-R'$ wherein R and R' are members of the class consisting of secondary and tertiary amino groups and $x$ is one of the integers 1, 2, 3 and 4. Typical thioamines which may be employed according to our invention include, among others:

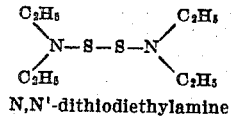

N,N'-dithiodiethylamine

N,N' - trithiodiethylamine, N,N' - dithiodibutylamine, N,N'-trithiodibutylamine, N,N'-dithiodimethylamine, N,N'-dithiodipropylamine, N,N'-dithiodiisopropylamine, N,N' - dithiodiisoamyl - amine, N,N'-dithiocyclohexylamine, N,N'-trithiomorpholine, N,N'-tetrathiomorpholine, N,N'-dithiopiperidine, N,N' - dithiobenzylamine, and N,N'-dithioaniline. It will be understood that these compounds are illustrative of the types of thioamines which may be employed, and that other thioamines having the general structural formula $R-S_x-R'$ may be employed if desired. For convenience, these compounds will be referred to herein as N,N'-polythioamines.

These N,N'-polythioamines can be made by reacting an amine having at least one active hydrogen atom in the amino group with sulfur chloride in the presence of a reaction diluent to form the dithioamine, but if a trithioamine is desired, the dithioamine is reacted with sulfur at elevated temperatures. Specifically, one method of producing dithiodiethylamine can be carried out by reacting two molecular equivalents of diethylamine with one molecular equivalent or a slight excess over one molecular equivalent of sulfur chloride, say 10% excess, in the presence of at least two molecular equivalents of sodium hydroxide and generally in the presence of an inert reaction diluent such as benzene. The benzene is removed from the reaction mixture by steam distillation, and the product is recovered by the addition of water which dissolves the sodium chloride formed during the formation of the dithioamine. A water-insoluble oily liquid product, dithiodiethylamine, is then recovered by decantation.

When trithiodiethylamine is desired, dithiodiethylamine is reacted with sulfur, slightly in excess of a one molecular equivalent ratio of sulfur to the dithioamine, at a temperature of about 120° C. The product is recovered by removing any excess sulfur by filtration. Thus, the corresponding N,N'-polythioamines can be made from such amines as dimethylamine, diethylamine, dipropylamine, diisopropylamine, dibutylamine, diisobutylamine, diisoamylamine, dicyclohexylamine, morpholine, piperidene, aniline, benzylamine, and the like.

We have discovered that these N,N'-polythioamines are highly efficient fungicides and insecticides, being effective in aqueous dispersions as dilute as 10 to 100 P. P. M. against spores of *Alternaria solani* fungus as dilute as 100 P. P. M. against the larvae of the common mosquito (*Culex quinquefasciatus*) and killing Mexican bean beetles in aqueous dispersions as dilute as 0.25% by weight.

The N,N'-polythioamines with which this invention is concerned were tested to determine their fungicidal, insecticidal and bactericidal activity according to methods understood by those familiar with the art of testing insecticides, fungicides and bactericides.

The more detailed practice of the invention is illustrated by the following examples and descriptions which demonstrate the application of various N,N'-polythioamines to bactericidal, fungicidal and insecticidal uses. In each test, varied concentrations of the specific N,N'-polythioamines were employed, but only those tests which illustrate the remarkable effectiveness of the materials or the results which are commonly used for comparison with other pesticidal compositions are given in detail.

Insecticidal tests

Mexican bean beetles were placed in a Petri dish on wet bean foliage which had previously been dipped in a 0.25%, by weight, aqueous dispersion of dithiodiethylamine and the dishes covered. By this treatment, all of the beetles were dead after 24 hours.

Dithiodibutylamine and trithiodibutylamine when employed in the same manner against Mexican bean beetles exhibited the same killing power.

Two sets of 10 *Culex quinquefasciatus* (common mosquito) larvae 5 to 6 days old were placed in duplicate tests at 29° C. in aqueous dispersions containing 100 P. P. M. of dithiodiethylamine. All the larvae were dead at the end of 16 hours by this treatment.

Dithiodibutylamine when tested under the same conditions produced a 70% kill of the mosquito larvae in 16 hours.

Fungicidal tests

In a test to determine fungicidal activity, various amounts of trithiodibutylamine were incorporated into Difco malt extract agar, the agar was poured into Petri dishes, and the treated nutrient in the dishes was inoculated by spraying some with spore suspensions of *Alternaria solani* and others with spore suspensions of *Sclerotinia fructicola* by means of an atomizer. By this treatment, it was found that when 100 P. P. M. of trithiodibutylamine was present, no spores of Alternaria germinate, while 10 P. P. M. of trithiodibutylamine prevented germination of spores of *Sclerotinia fructicola*, after an incubation of three days at 21° C.

In another test of fungicidal activity, various amounts of trithiodibutylamine were added to spore suspensions of *Alternaria solani* and *Sclerotinia fructicola* in 1% orange juice solutions containing 50,000 spores per c. c. Small measured droplets of these mixtures were placed on microscope slides and held at 21° C. in a moist chamber for 18 to 24 hours. Concentrations of 100 P. P. M. permitted only half of the spores to germinate in each case.

Bactericidal test

To illustrate the bactericidal properties of these polythiodialkylamines, concentrations of 100 P. P. M. of trithiodibutylamine were incorporated into 10 ml. portions of Difco nutrient broth and 10% beef serum containing *Staphylococcus aureus*. After incubation at 40° C. for 24 hours, it is found that this concentration killed the bacteria in the serum as well as in the broth.

The polythio compounds of the amines hereinbefore enumerated can be employed in the above tests and will produce results comparable to those given in the above examples.

The N,N'-polythioamines are not only useful in killing Mexican bean beetles and mosquito larvae, but they also may be used to kill or repel other insect pests such as Japanese beetles, codling moths, carpet beetles, confused flour beetles both adult and larvae, flies, ticks, fleas and the like.

These N,N'-polythioamines may be used in combination with other active ingredients such as other fungicides, insecticides and the like, for example metallic arsenicals, fluosilicates, organic thiocyanates, phenothiazine, nicotine, pyrethrum, rotenone, isobutylundecylenamide, and others as a general or all-purpose pesticidal composition. These mixtures may be also diluted with such inert ingredients as bentonite, talc, calcium carbonate and tricalcium phosphate by milling the ingredients in the usual manner, or they may be dissolved or suspended in petroleum hydrocarbons, water or alcohol. Dispersing, wetting and spreading agents such as lauryl alcohol, long-chain alcohol sulfates, sulfated and sulfonated alcohols, sodium salts of sulfated alcohols, sulfonated aliphatic derivatives, sulfonated aromatic or alkylaryl derivatives, hexahydric alcohols, esters of fatty acids, pine oils, and soybean lecithin may be used to aid in stabilizing the suspensions. Adhesives or sticking agents such as milk products, flour, gelatine, and fish oils may be incorporated into the mixtures to increase the retention or tenacity of spray deposits.

By employing these N,N'-polythioamines in solutions, dispersions or dusts, they may conveniently and economically be used as agents for protecting plant and animal life or the products derived thereof from such harmful pests as molds (fungi), insects and bacteria.

The solvents, dusts and aqueous suspensions employed for convenience of application of pesticides have the common property of permitting projection of the materials through suitable jets or nozzles onto the materials being treated and will, therefore, be designated in the appended claims for convenience as "fluent carriers."

The above description and examples are intended to be illustrative of our invention and are not intended to impose any limitation thereon, for any modification of or variation therefrom which conforms to the spirit of the invention is intended to be included within the scope of the claims.

We claim:

1. A pesticidal composition comprising as the essential active ingredient 10 parts per million to 0.25% by weight of a compound selected from the group consisting of N,N'-dithiodiethylamine, N,N'-trithiodiethylamine, N,N'-dithiodibutylamine, N,N'-trithiodibutylamine, N,N'-dithiodimethylamine, N,N'-dithiodipropylamine, N,N'-dithiodiisopropylamine, N,N'-dithiodiisoamylamine, N,N'-dithiocyclohexylamine, N,N'-trithiomorpholine, N,N'-tetrathiomorpholine, N,N'-dithiopiperidine, N,N'-dithiobenzylamine, and N,N'-dithioaniline, said active ingredient being homogeneously dispersed in a nonsolvent fluent carrier.

2. A pesticidal composition comprising as the essential active ingredient 10 parts per million to 0.25% by weight of N,N'-dithiodiethylamine homogeneously dispersed in a nonsolvent fluent carrier.

3. A pesticidal composition comprising as the essential active ingredient 10 parts per million to 0.25% by weight of N,N'-trithiodibutylamine homogeneously dispersed in a nonsolvent fluent carrier.

4. A pesticidal composition comprising as the essential active ingredient 10 parts per million to 0.25% by weight of N,N'-dithiodibutylamine homogeneously dispersed in a nonsolvent fluent carrier.

5. A pesticidal composition comprising as the essential active ingredient a compound selected from the group consisting of N,N'-dithiodiethylamine, N,N'-trithiodiethylamine, N,N'-dithiodibutylamine, N,N'-trithiodibutylamine, N,N'-dithiodimethylamine, N,N'-dithiodipropylamine, N,N'-dithiodiisopropylamine, N,N'-dithiodiisoamylamine, N,N'-dithiocyclohexylamine, N,N'-trithiomorpholine, N,N'-tetrathiomorpholine, N,N'-dithiopiperidine, N,N'-dithiobenzylamine, and N,N'-dithioaniline, said active ingredient being homogeneously dispersed in an aqueous solution of a dispersing agent.

6. A pesticidal composition comprising as the essential active ingredient 10 parts per million to 0.25% by weight of N,N'-dithiodiethylamine homogeneously dispersed in an aqueous solution of a dispersing agent.

7. A pesticidal composition comprising as the essential active ingredient 10 parts per million to 0.25% by weight of N,N'-trithiodibutylamine homogeneously dispersed in an aqueous solution of a dispersing agent.

8. A pesticidal composition comprising as the essential active ingredient 10 parts per million to 0.25% by weight of N,N'-dithiodibutylamine homogeneously dispersed in an aqueous solution of a dispersing agent.

WILLIAM D. STEWART.
JOHN H. STANDEN.

REFERENCES CITED

The following references are of record in the file of this patent:

UNITED STATES PATENTS

| Number | Name | Date |
|---|---|---|
| 1,842,711 | Birchall et al. | Jan. 26, 1932 |
| 1,972,961 | Tisdale et al. | Sept. 11, 1934 |
| 2,259,164 | Jones | Oct. 14, 1941 |
| 2,342,481 | Muller | Feb. 22, 1944 |
| 2,384,577 | Thomas | Sept. 11, 1945 |